June 21, 1955 A. C. PETERSON 2,711,295
CONVERTIBLE AIRCRAFT WITH DISK SHAPED AIRFOIL
Filed Aug. 11, 1952 8 Sheets-Sheet 1

INVENTOR
Adolph C. Peterson.

June 21, 1955 — A. C. PETERSON — 2,711,295
CONVERTIBLE AIRCRAFT WITH DISK SHAPED AIRFOIL
Filed Aug. 11, 1952 — 8 Sheets-Sheet 6

INVENTOR
Adolphe Peterson.

United States Patent Office 2,711,295
Patented June 21, 1955

2,711,295

CONVERTIBLE AIRCRAFT WITH DISK SHAPED AIRFOIL

Adolphe C. Peterson, Edina, Minn.

Application August 11, 1952, Serial No. 303,788

14 Claims. (Cl. 244—7)

My invention relates to aircraft and especially to the type of aircraft which embody means and combinations whereby the aircraft may be convertible from the status of fixed wing flight to the status of rotary wing means supported flight or soaring, and my invention is therefore called convertible aircraft.

The principal objects of my invention are to provide a form of aircraft which shall have the ability to travel at relatively high speed as a fixed wing aircraft and which shall have the ability to travel slowly as a form of rotary wing aircraft and in relatively soaring condition while hovering in the air or preparing for alighting, and which shall by reason of its said convertibility, also have the ability to take off at relatively no speed of translational travel, or even in some cases or situations to take off without any preparatory travel over the ground. It is especially an object to provide such a means in a form which will have the advantage which the form of disk or saucer shape will give not only in the actual travel of the aircraft as a fixed wing aircraft, but which will also by reason of the same disk-like form have an advantage in construction. The advantage in construction referred to will result from the fact that the disk-like shape of the device will enable construction with great strength with a minimum of weight and complication. The circular form of the disk-like aircraft herein described, will enable a balanced construction over all parts and sections of the aircraft, generally considering it, and this balanced construction provides great strength with the minimum of weight. This disk-like shape of the aircraft also will provide the maximum of load carrying or passenger carrying form in the aircraft. The aircraft, of disk-like shape as shown in the drawings, has devices and combinations which will facilitate construction and operation of such an aircraft with the minimum of complication and expense in proportion to its ability as an aircraft for passenger and load carrying use. In general the object is to provide a disk-shaped aircraft which has an efficient form and construction and elements in its form of rotary wing construction and stabilizing means which enable construction of an efficient aircraft, efficient in speed of travel, efficient in cargo and passenger carrying capacity, and constructable with a minimum of expense and complication in proportion to its capacity and ability.

The principal devices and combinations of devices comprising my invention, are as hereinafter described and as defined in the claims. In the accompanying drawings, which illustrate my device in two general forms, each having particular forms of devices adapted to it, like characters refer to like parts throughout the several views. Referring to the drawings:

Figures 3, 4, and 7 are drawn to a scale which is almost seven times that of Figure 2 and still larger in proportion to the scale of Fig. 1, and Figures 5 and 6 are also drawn to the same scale as the scale of Figures 3, 4, and 7. Fig. 10 is also drawn to a scale approximately that of Figs. 3, 4, 7.

Figure 21 is an enlarged vertical section on the lines 21—21 of Figures 19, 25, and on same plane as Fig. 20, but this

Figures 1, 7:
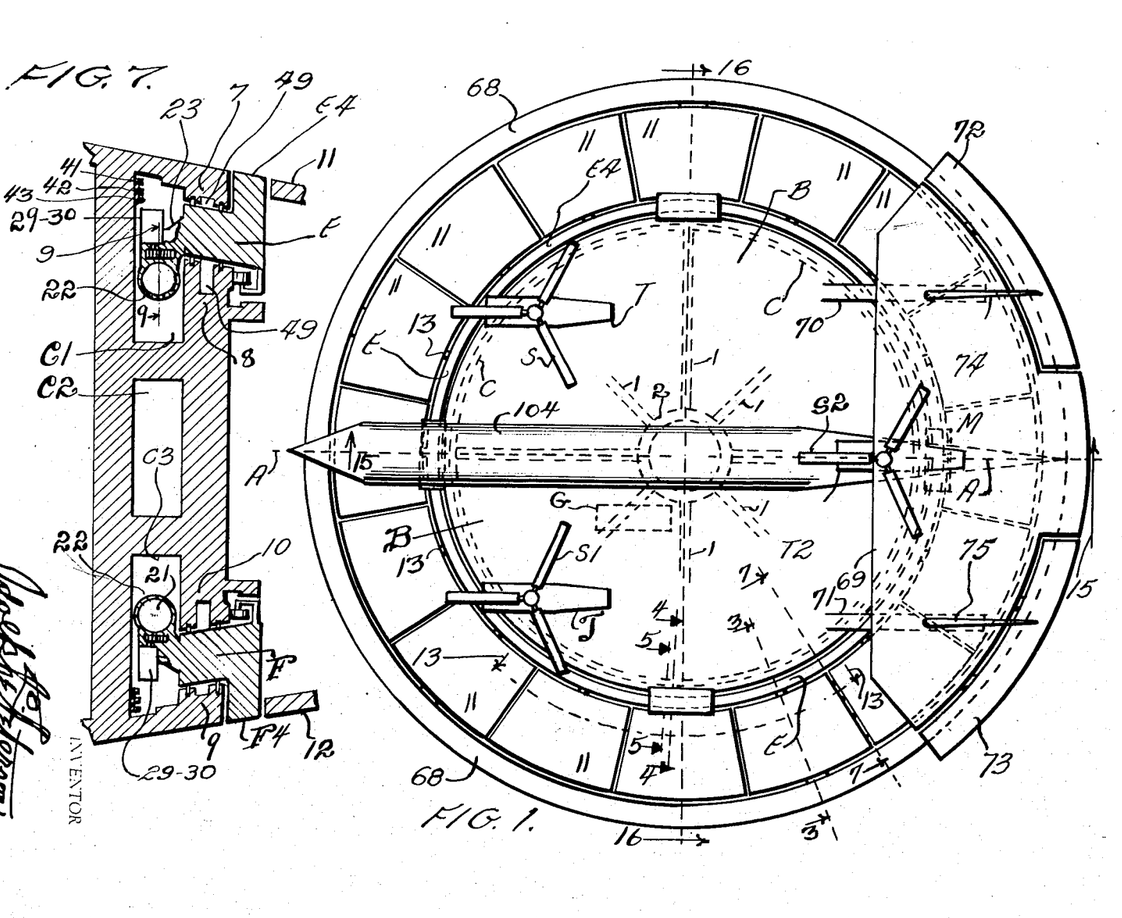
Figure 1 is a full plan view of an aircraft embodying my invention, this view illustrating rather diagrammatically the main features of my invention to illustrate the general construction and assemblage, and is drawn to a scale which is approximately two-thirds of the scale of Figure 2.
Figure 7 is a section on the line 7—7 of Figures 1 and 2, showing the detail construction at this vertical plane of sections of the upper annular airfoil mounting ring and the lower annular airfoil mounting ring and through the detail airfoil operating or adjusting means this being shown partly in section and partly in side elevation.
Figures 2, 12, 13, 14:
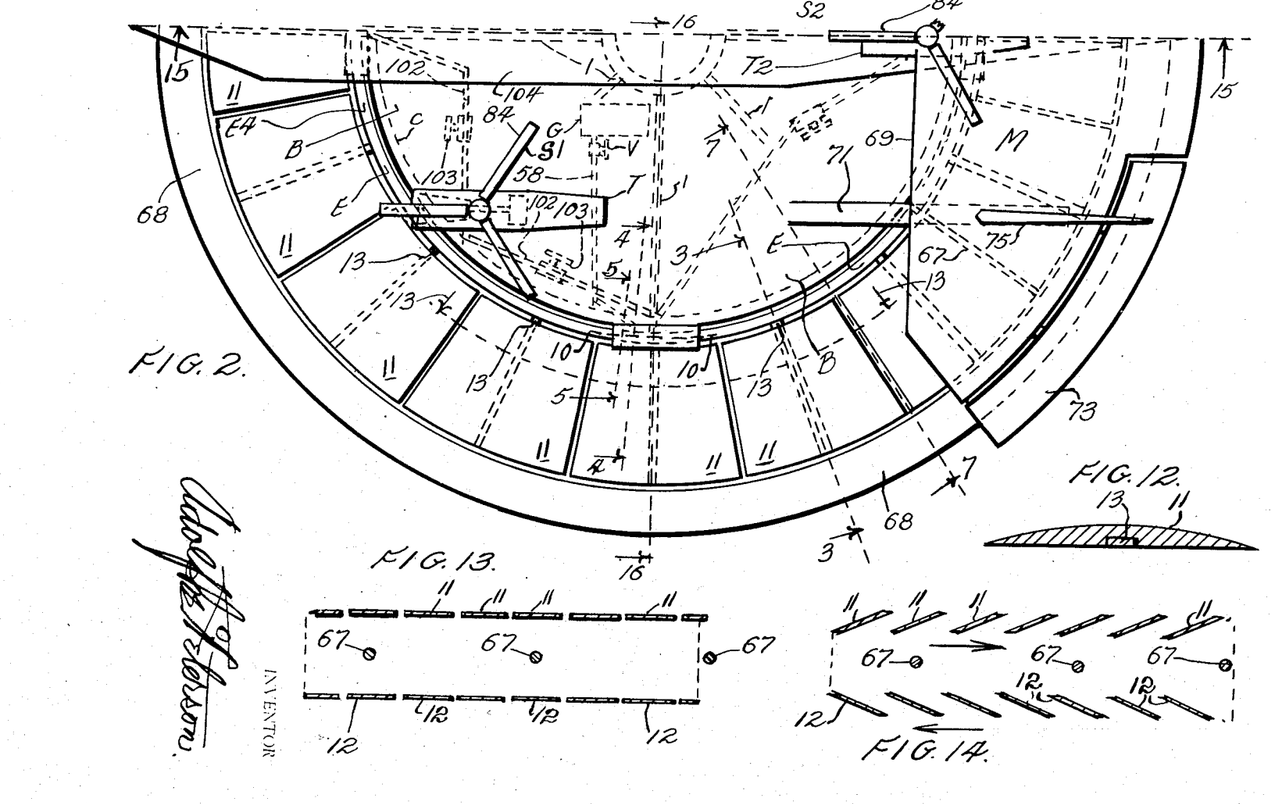
Figure 2 is a plan view on a scale somewhat larger than that of Figure 1 (Figure 1 being approximately two-thirds the scale of Figure 2) but showing only a one-half part approximately of the aircraft in plan view, the part below the line A—A of Figure 1, this one-half being shown in larger scale in order that the association of parts may be more clearly illustrated, it being noted that the other one-half not shown in Figure 2, is approximately the same in construction, but in the reversed form.
Figure 12 is a somewhat enlarged detail section through one airfoil blade to show an airfoil section which it may have, it being noted that this airfoil section may be any form which may be adopted as most suitable, the transverse section being not necessarily that shown in Figure 12, but any suitable form which will be most efficient in use, the plan form of each airfoil blade, being however as shown in Figures 1 and 2, preferably, in order that the entire aircraft may have the general characteristics and form as shown in the plan Figures 1 and 2.
Figure 13 is a section on lines 13—13 of Figures 1 and 2, in much reduced scale, to show the general position of airfoil blades with relation to each other, when in fixed wing flight condition, the airfoil blades of the entire aircraft, around the ring construction, being then as in Figure 13, aligned and substantially in the two planes shown, around the ring construction, so that no airfoil blades are then in the tilted or rotating wing condition.
Figure 14 is a section similar to Figure 13 on the same lines 13—13, but showing the airfoil blades (their sections) in the tilted or rotating wing condition, the airfoil blades of the upper ring being tilted one way and the airfoil blades of the lower ring being tilted the other way for the opposite rotation.

Referring first to Figures 1 and 2 to provide a general description of the invention so that the relation of the main parts to each other may be understood, the aircraft structure is composed in general of a cabin or load carrying structure which is the base for the entire structure and this cabin or load carrying structure, designated generally as B, is a circular disk-like framed structure having as a main supporting and uniting member an annular or ring like member which may be called the annular wall and is denoted generally as C. The annular wall C is large enough to completely surround as a perfect circle the cabin or load carrying structure and be a part of it as its main supporting unit, and it may be constructed of aluminum or magnesium or any alloy or steel or even of wood or some plastic. The vertical height of the annular wall C is greater than the thickness or width through the wall at any section, horizontally. The annular wall C in any construction may be formed as a circle which should be say at least fifty or sixty feet in diameter and may be much larger even as much as one hundred feet in diameter or even more in the very large constructions. Frame members 1 of aluminum or steel or other rigid and strong substance are placed at the top of the section B and radiate from a strong central circular member 2 and radially outwardly to equally distantly separated points on the top of the structure B and these frame members 1 are strongly welded or riveted to or otherwise attached to the circular member 2 at one end and at their outer ends to the upper edge of the annular wall C. Similar frame members 3 are rigidly attached to a circular frame member 4 at inner ends and to the lower side of the annular wall C at the outer ends, the members 3 radiating out from the central frame member 4, and member 4 and members 3 thus form the lower side of the structure B. Sheet skin or surface metal enclosing walls 5 are attached to top frame members 1 and similar surface metal enclosing walls 6 are attached to the lower frame members 3, and the load carrying structure B is thus enclosed by annular wall C, walls 5, and walls 6 to form the load carrying cabin and main structure of the aircraft, this structure taking the place of what is commonly called fuselage and it may be otherwise called a disk fuselage, for designation.

Figures 10, 15, 16:
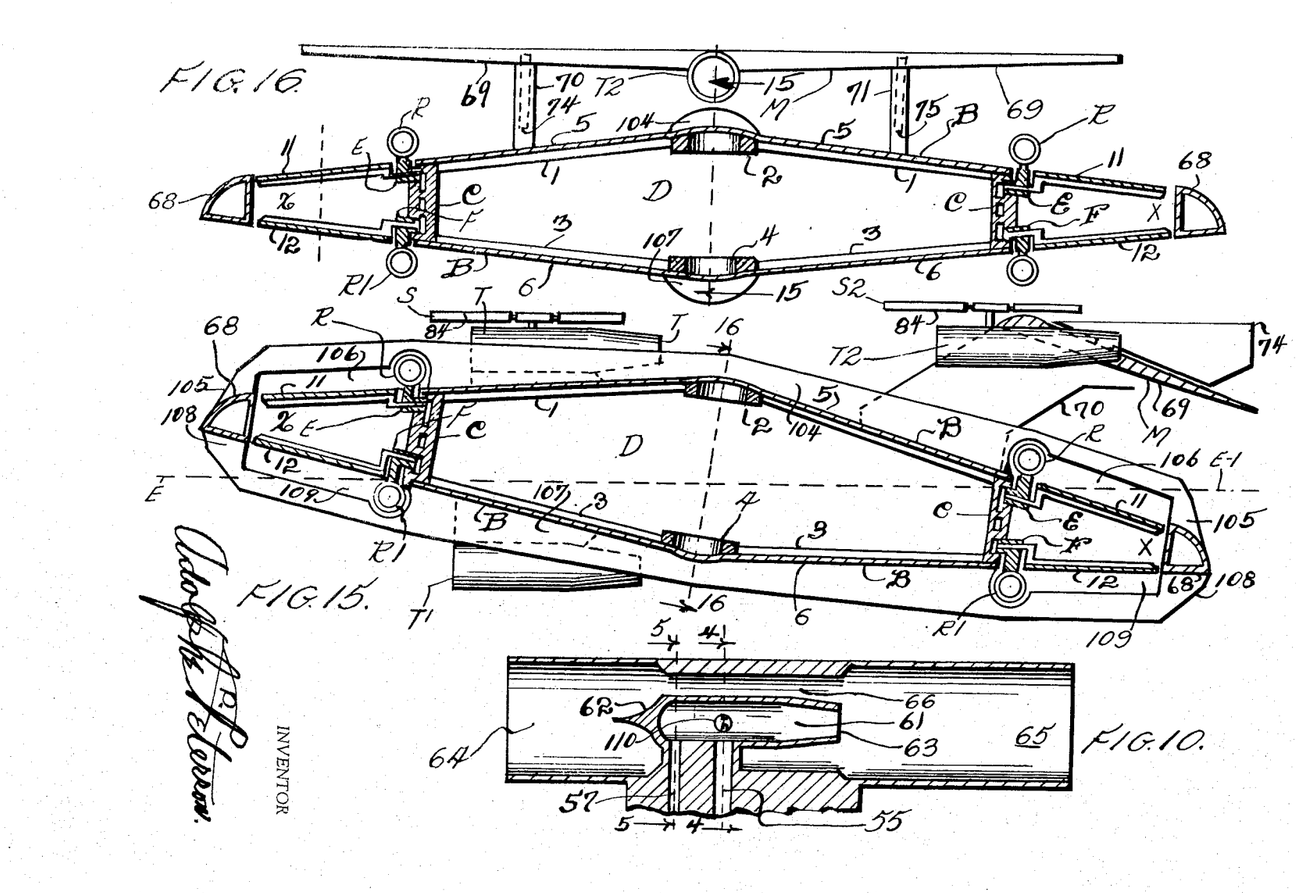
Figure 10 is a view in vertical section through the axial center, that is through the axial center of the line of flow for propulsion through one of the ram-jet-rocket devices, which devices are generally designated R in the figures, this vertical section being on the lines 10—10 of Figures 4, 5, 3, this view showing the relation of air and fuel supply conduits to the ram-jet and rocket device. This section will illustrate the general construction of the similar devices $R^1$ which are mounted on the lower annular airfoil mounting ring, one of which is shown in transverse section in Figure 6, and also in Fig. 4, the mounting being reversed vertically.
Figure 15 is a view in section on the lines 15—15 of Figures 1 and 2, approximately on the scale of Figure 2, on a vertical plane passing through the longitudinal center of the aircraft. This section is on line 15—15 of Figure 16.
Figure 16 is a view in section on the lines 16—16 of Figures 1 and 2 (and line 16—16 of Fig. 15), approximately on same scale as Figure 2, on a plane at approximately to the vertical and passing transversely of the aircraft, that is at right angles transversely of the plane of Fig. 15.

The wall members 5 and 6 and their frame members 1 and 3 are as shown in Figures 15 and 16 shaped so that the enclosed load carrying space, denoted D, is deeper at its center than at its outer parts, and this results in the disk shaped but angling upper wall 5 and similar lower wall 6. The shape of these upper and lower surfaces of the structure B should be that which is determined to be best for efficient aerodynamic sustentation effect in fixed wing flight as hereafter described, and while it is shown as partly curved and partly straight in diametric vertical section, the surfaces in section, exteriorly may be curved in a very moderate curve, or such shape as is deemed aerodynamically most efficient. In this disk-like main structure B, the general shape of the structure, annular wall C and rigid attached frame members 1 and 3, is such that great strength is afforded in proportion to weight of the structure, but it may be noted that any vertical partitioning members or structure, interiorly of the structure, may be added as rigidly uniting top and bottom frame members 1 and 3, to give any additional strength as is desired. The annular wall C is shown as one metal structure for simplicity in illustration but it is contemplated that it may be constructed according to the best engineering principles for strength with light weight, while still having internal space as hereafter specified.

The main function of the annular wall C is to form the main supporting frame member of the structure B, but this annular wall C has additional functions, one of which is the supporting of two annular airfoil mounting rings, an upper and a lower, and another of which is to form annular spaces wherein certain adjusting means may move annularly, and another is to provide annular spaces through which air under pressure may be supplied to the airfoil structure, and whereby in other spaces fuel or gas fuel may be supplied to the operating means, and also to support contact surfaces for electric control elements.

The annular wall C is made to function as a supporting structure for two annular airfoil mounting rings, the upper generally denoted E and the lower generally denoted F, each of these being in diameter approximately that of the annular wall C, somewhat larger in parts, each being strong enough to support a number of airfoil blades, and each supporting its special associated propulsion means as hereafter described, and each supporting airfoil adjusting or operating means as hereafter described. In the upper part of the annular wall C there is formed a space C1, below that there is formed an intermediate space termed air supply space C2, below that there is formed a space C3; all of these spaces C1, C2, C3, being spaces which are separate from the other such spaces and are continuous spaces passing annularly in the annular wall C to form a continuous annular space each separated from the other and each forming an air or gas containing space by which air or gas may be transmitted and passed from it as hereafter described. The spaces C1 and C3 especially are large enough so that adjusting means hereafter described may travel in the spaces without hindrance in a circle or circles passing annularly about the structure B in the annular wall C.

Figures 3, 8, 9, 11:
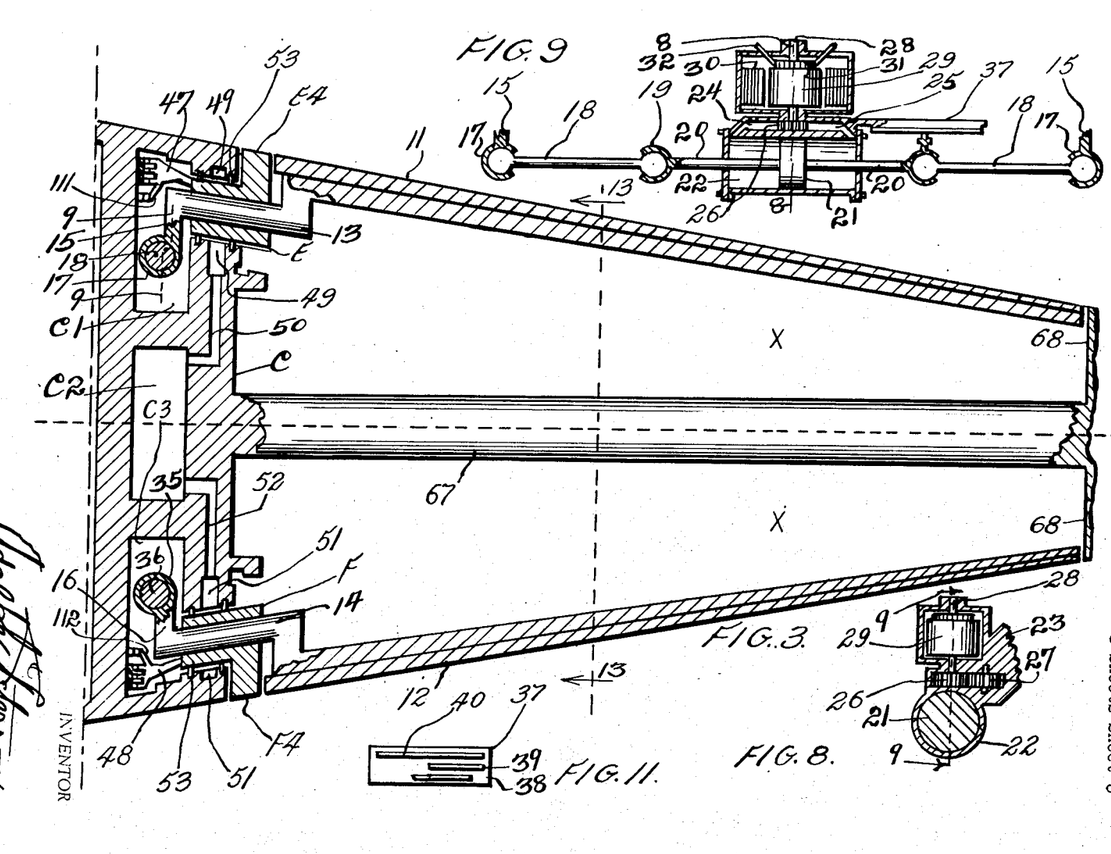
Figure 3 is a view in detail section through a vertical pair of airfoil blades, that is on a vertical plane passing through the axes of the root or anchor axles upon which each of the pair of airfoil blades or airfoils is capable of oscillation for alternative conditions of operation, this section being on the lines 3—3 of Figures 1 and 2.
Figure 8 is a detail section also at the location of the line 7—7 of the above mentioned operating or adjusting means as related to one airfoil of the upper annular airfoil mounting ring, this view being somewhat enlarged over that of Figure 7, on lines 8—8 of Fig. 9.
Figure 9 is a vertical detail section on the line 9—9 of Figures 3, 7 and 8, this view being enlarged as on the scale of Figure 8.
Figure 11 is an under-side view of the contact plate or member which is a part of each operating or adjusting means shown in detail in Figures 8 and 9, this plate having fixed on it various contacts.

In the upper part of annular wall C there is formed an annular space between sections 7 and 8 of the annular wall and in this space there is mounted to rotate as a ring therein the annular airfoil blade mounting ring E or that part which fits in this space. Similarly in the lower part of annular wall C there is formed an annular space between sections 9 and 10 of the annular wall and in this space there is mounted to rotate as a ring therein the annular airfoil blade mounting ring F or that part which fits in this space. Thus each of these mounting rings E and F may rotate as a unit about the structure B supported in the spaces indicated and by the annular wall C, and that support is additionally supported by mounting wheels as hereafter described to avoid undue friction in the rotation. The upper mounting ring E has mounting wheels E1 and E2 and the lower mounting ring F has mounting wheels F1 and F2, and all of these mounting wheels are supported by axles E3 or F3 on the respective mounting rings and to roll on surfaces formed in annular wall C. The surfaces on which these mounting wheels roll are shown in section in Figures 3, 4, 7. Each mounting wheel may be mounted on its axle by any type of ball or roller bearings to lessen friction.

The mounting ring E has an angular section so that one limb of that section protrudes upwardly outside of annular wall C and this section, denoted E4 is visible in the sectional figures and also in Figures 1 and 2. The mounting ring F has an angular section so that one limb of that section protrudes downwardly outside of annular wall C and this section, denoted F4 is visible in the sectional Figures 3, 4, 7, 6, but is not visible in Figures 1 and 2, since this mounting ring F is below the mounting ring E and the section F4 is visible from the underside of the structure. The upper surface of section E4 and the lower surface of section F4 each generally are aligned with the adjoining wall surface of structure B, that is walls 5 and 6, so that they do not aerodynamically affect the flow of air, except that there are mountings therein, as hereafter described.

The mounting ring E has as its chief function the support of a number of airfoil blades each denoted 11, there being sixteen illustrated and forming this structure, but it is contemplated that this number may be any suitable number as found most efficient for construction and for aerodynamic functioning as a rotary wing structure. The mounting ring F has as its chief function the support of a number of airfoil blades each denoted 12, there being sixteen in the construction as illustrated. The airfoil blades 11 each have support by a mounting axle or pivoting member 13 and the blade is rigid with the pivoting member 13 so that as one oscillates on axis of member 13, the other will. The airfoil blades 12 each have support by a mounting axle or pivoting member 14 and the blade is rigid with its pivoting member 14 so that as one oscillates on axis of member 14 the other will also. Pivoting members 13 have cranks 15 in spaces C1. Pivoting members 14 have cranks 16 in spaces C3. Each crank 15 has connected to it by ball and socket or universal joint 17 one end of an adjusting connecting rod 18. The latter at its opposite end is connected by a ball and socket or other universal joint to the near end of a double ended piston rod, the ball and socket joint is denoted 19 and the piston rod 20. As will be seen in Fig. 9 each piston rod 20 is connected to two of the connecting rods 18, one at each end of the piston rod, and the two associated connecting rods 18 are as described connected by the ball and socket joints 17 to the two associated cranks 15. Thus each piston rod 20 with its attached piston head 21 serves two adjoining cranks 15 which are associated with a pair of the airfoil blades 11. Since there are sixteen airfoil blades 11, there are eight of the piston rods 20 each having its piston head 21. Each piston head 21 is reciprocable in an associated cylinder 22 and there are thus eight of the cylinders 22, each of which is attached by a mounting bracket 23 to the inside part of the mounting ring E. Each cylinder 22 has ports 24 and 25, respectively at its opposite ends which form conduits from the respective ends of the cylinder to the opposite sides of a gear type pump having gears 26, 27, in a space in the casing of the cylinder, one of which gears 26, 27, is fixed on and driven by armature shaft 28 of armature 29 which rotates in field 30 and has commutator 31 and brushes 32, the field 30 having two sets of field coils 33, 34, one for driving of the motor one way and the other for driving the reverse way. Each cylinder 22 has this pump means and electric motor for driving it for either direction of drive, so that thus liquid in the cylinder 22 may be moved from either end of the cylinder to the other under pressure and power created by the electric motor associated. Each motor is in such circuit as hereafter described so that all may be simultaneously driven in either of its directions to procure movement of the associated piston head 21 and rod 20 in either of its directions of movement.

Each crank 16 of the pivoting members 14 of the airfoil blades 12 of the lower mounting ring F has connected to it by a ball and socket joint or other universal joint 35 one connecting rod 36 of an associated means such as has been above described in connection with each pair of airfoil blades 11 of the mounting ring E, so that each pair of airfoil blades 12 may be moved by oscillation on its pivoting member 14, so that all of the airfoil blades of the lower mounting ring F may be caused simultaneously to move from one condition to another. Illustration of the adjusting means is not again shown since it is to be contemplated and understood that each pair of airfoil blades 12 of the lower mounting ring F has adjusting means like that of each pair of blades of mounting ring E, and simultaneously controlled, the control being arranged, however, so that adjustment at any time of the blades of the mounting rings E and F procures such oscillation or adjustment that in a rotating wing condition the mounting rings may move in opposite directions but their airfoil blades will procure sustentation or lift effect in the same direction on the aircraft.

Each of the cylinders 22 of the set of mounting ring E, and likewise each similar set of the mounting ring F has attached or formed with it a contact bracket 37 which has formed on one side or surface three contacts 38, 39, 40, which are insulated from each other (by any means not shown), and which are included in control circuits, as hereafter described. It will be seen in the sectional figures that the space C1 permits all adjusting cylinder and piston means and its motor operating means to move or be carried in rotation with its associated mounting ring E, and likewise all such adjusting means of the airfoil blades of the mounting ring F may be carried in rotation with the mounting ring F, the adjusting means moving in the space C3. There is also space in annular space C1 for three annular ring contacts 41, 42, 43, respectively, all mounted by any insulating means on the adjacent surface of the annular wall C, that is the surface thereof exposed interiorly to space C1. Likewise there is space in annular space C3 for three annular ring contacts 44, 45, 46, all mounted by any insulating means on the adjacent surface of the annular wall C, that is the surface thereof exposed interiorly to space C3. The contacts 41, 42, 43, may be contacted separately by one of three brush contacts mounted on and carried by brush contact arm 47 which is fixed on mounting ring E to be carried with the latter in rotation, the contact or brush arm moving with the mounting ring E. Similarly contacts 44, 45, 46, may be contacted separately by one of three brush contacts mounted on and carried by brush contact arm 48 which is fixed on mounting ring F to be carried with the latter in rotation, the brush arm moving with the mounting ring F.

The annular wall C has formed in it immediately adjacent the mounting ring E a pair of annular ports or passages 49 one of which is below and the other of which is above the annular ring E and each of these is connected by air conduits 50 with a supply of air under pressure, supplied and controllable as hereafter described. The annular wall C has also formed in it immediately adjacent the mounting ring F a pair of annular ports or passages 51 one of which is below and the other of which is above the annular ring F and each of these is connected by air conduits 52 with the same supply of air under pressure, supplied and controllable as hereafter described. One purpose of this air supply under pressure is to supply the ram-jet-rocket means as hereafter described and another purpose is to prevent loss of fuel gas or fluid by carrying any leakage thereof with it into the ram-jet-rocket means (when supplied). Packing mean 53 aids in preventing such loss. The main air supply is received in the annular space C2 by main air conduit 54. The air supplied to these conduits may pass by four air conduits 55 formed in annular ring E to each of four ram-jet-rocket means R to supply combustion. Likewise air from the same source may pass by four air conduits 56 formed in annular ring F to each of four ram-jet-rocket means R1 to supply combustion.

Figures 4, 5, 6:
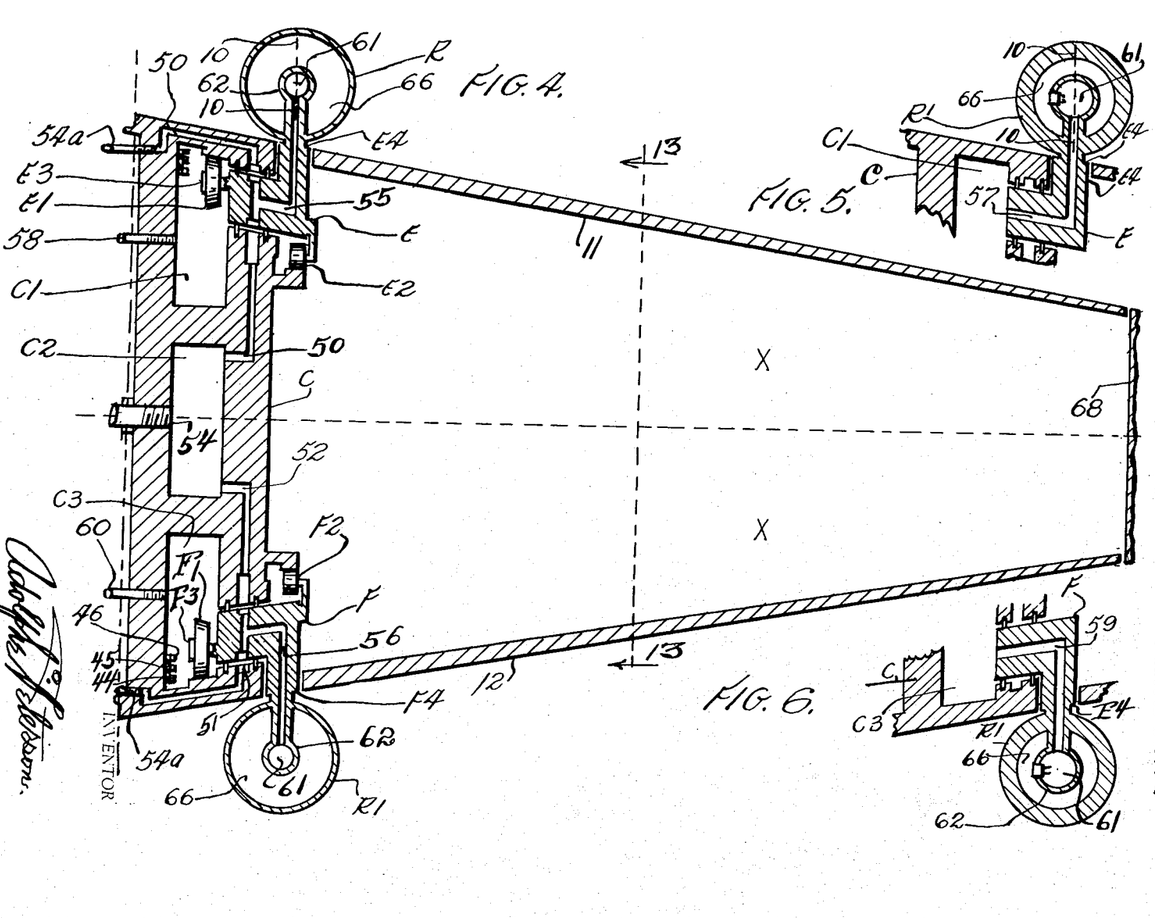
Figure 4 is a view in detail section through a vertical pair of airfoil blades (airfoils), that is on a vertical plane passing through the pair of the airfoils at the location of the line 4—4, the vertical section being on the line 4—4 of Figures 1 and 2, this section illustrating in addition to the section of the airfoils a pair of ram-jet and rocket devices, one mounted on each of the two annular airfoil mounting rings (these rings being shown in Figures 3 and 4).
Figure 5 is a vertical section in detail on line 5—5 of Figures 1 and 2, but showing a detail of the upper annular airfoil mounting ring only, and showing with it a section through one of the four ram-jet and rocket devices mounted on this upper ring and the fuel supplying conduit delivering fuel therethrough from the annular space associated with this upper ring and its ram-jet-rocket.
Figure 6 is a vertical section the same as Figure 5 in section on line 5—5 of Figures 1 and 2, but showing the same details in connection with the lower annular airfoil mounting ring (the lower ring).

Each device R has also delivery to it by an associated one of four conduits 57 formed in annular ring E, Figures 5 and 10, of fuel gas as supplied to space C1 by a fuel-gas supply pipe 58 from a fuel-gas tank or other fuel bearing fluid supply means generally denoted G. This fuel-supply may be of carburetted air, heavily carburetted, but is preferably a supply of a stable gaseous fuel such as may be formed by a supply of propane or other fuel gas. It is contemplated that the illustration generally of means G includes any type of fuel which may be supplied and carried in a fluid form by pipe 58 to space C1 and which may enter by conduits 57 (open to space C1) to the combustion chambers of devices R. Each device R1 has also delivery to it by an associated one of four conduits 59 formed in annular ring F, Figures 6 and 10, of fuel gas as supplied to space C3 by the fuel gas supply pipe 60, and the latter is supplied with the fuel gas by the same means as supplies pipe 58.

The ram-jet-rocket devices R and R1 are each such as is shown in a section through one, in Figure 10, and each has the rocket combustion chamber 61, the air conduit supply by conduit 55 (ring E) or 56 (ring F), the fuel-gas supply by conduit 57 (ring E) or conduit 59 (ring F), these supplies of air under pressure and fuel-gas under pressure, passing to the interior rocket combustion chamber 61 formed within a rocket cylinder or means 62 closed at front end and open at rear end by rocket nozzle 63. The rocket cylinder 62 is suspended in the axial center of the ram-jet passage 64—65, 64 the open front air reception port and 65 the discharging passage of the ram-jet open at its rear end to atmosphere, the front end 64 being open to atmosphere to receive air. The restricted annular intermediate passage 66 connects 64 and 65, so that the passages 64, 66, 65 may act as a ram-jet means air passing through being combusted with excess fuel supplied by the fuel-gas conduit 57 or 59 or even with all the fuel gas so supplied in the event that there may be no further supply of air by conduits 55 or 56. The discharge outlets to atmosphere of all the devices R of the mounting ring E are in the same direction as to rotation of the mounting ring E, but the discharge outlets to atmosphere of all of the devices R1 of the mounting ring F are all in the opposite direction of rotation of mounting ring F, it being especially to be noted, that mounting ring F is thus forced to rotate in a direction opposite to the rotation of mounting ring E.

The annular wall C has fixed to it and extending radially from it at equally spaced distances around its outer circumference, rods 67 which are support rods or fixtures for an annular circumferential static wing edge forming member or ring 68 which completely surrounds the extreme outer edge of the aircraft, externally circumferentially of the mounting rings and their airfoil blades, and located vertically so as to close a gap between the outer edges of all airfoil blades 11 and 12, and so also as to form a somewhat continuous smooth surface from the adjacent flat surfaces of rotary wing means (when static) around that ring 68 from one to the other. Thus this ring aids in forming an efficient surface for air flow when the aircraft operates as a static or fixed wing aircraft. The rods 67 support ring 68 but these rods do not obstruct or interfere to any degree substantially with movement of air from the airfoil blades 11 to the airfoil blades 12 in operation as a rotary wing aircraft.

Referring to Figures 15 and 16, and 1 and 2, there are two turbine power units T mounted and fixed on the upper side of the cabin or load carrying structure B and these are mounted at locations near the front of structure B and one at a distance from longitudinal center line of the aircraft one side and the other at an equal distance from that center line to the other side. There are similar turbine power units T1 mounted and fixed below the structure B, depending from it, and at locations substantially as stated with respect to units T. There is also a turbine power unit T2 mounted rearwardly of the units T and in the longitudinal center plane of the aircraft, but this unit T2 is mounted and fixed at the horizontal center of a rear stabilizing wing airfoil 69, the latter being mounted and fixed by vertical struts 70, 71, to the structure B on the upper side of the latter. The airfoil 69 has mounted rearwardly of it, at lateral positions elevators or ailerons 72, 73, each of the latter being controllable as such elevators or ailerons are controllable in aircraft generally, the control means therefor being not therefore specifically shown. Vertical steering rudders 74, 75, are also fixed on this rear empennage structure, which is generally designated M. The rudders are hinged to their supports and controllable by any means as commonly used and which is not specifically shown. Figure 16 does not show rotor S2.

Figures 17, 19, 23, 24:
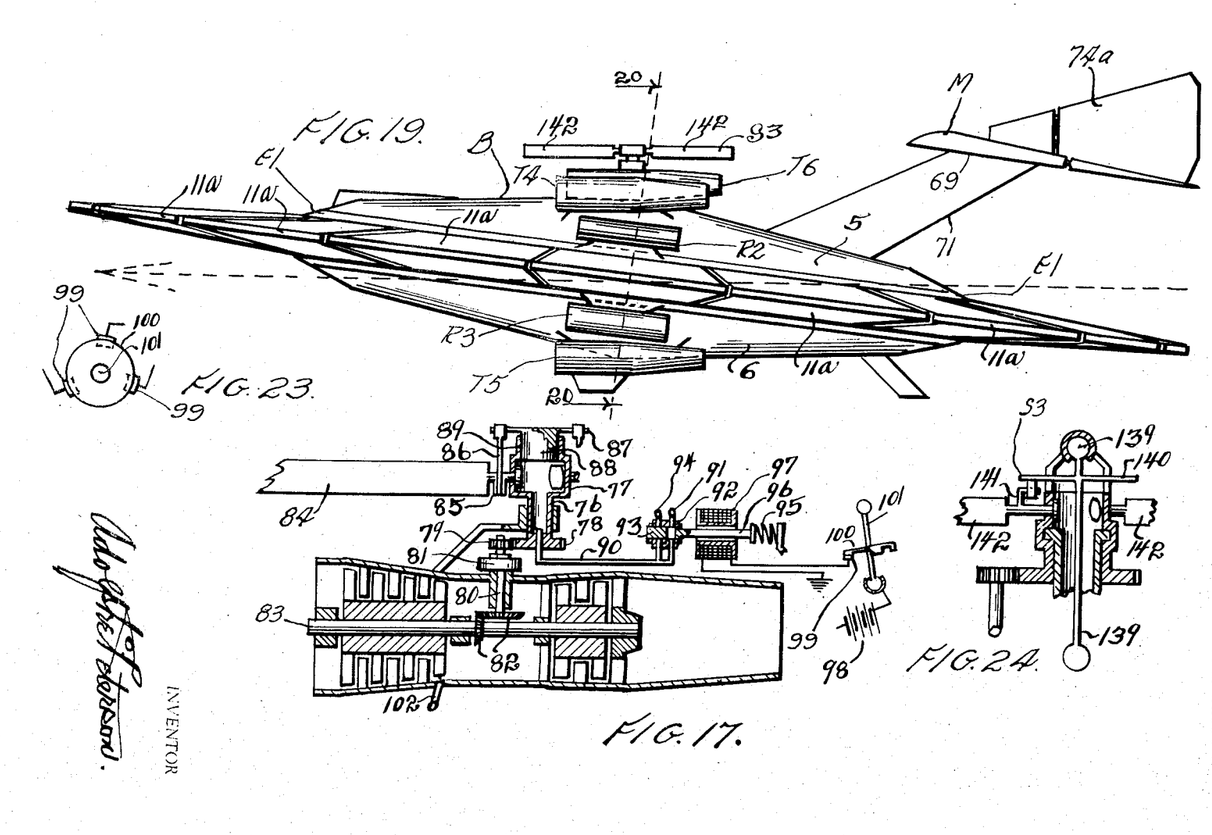
Figure 17 is a view in vertical section through the axial center of a power unit or nacelle, embodying turbine power plant and drive to one stabilizing rotor, this power plant and stabilizing rotor being generally designated T—S in the figures, there being three on the aircraft each mounted on the upper side or above the upper surface of the aircraft, each embodying with it a control as hereafter described.
Figure 19 is a side view of a modified form of my aircraft device and this view shows a single rotor form of the device.
Fig. 23 is detail of control of stabilizing means.
Fig. 24 is a vertical section, line 20—20 of stabilizing means.
Figures 18, 20:
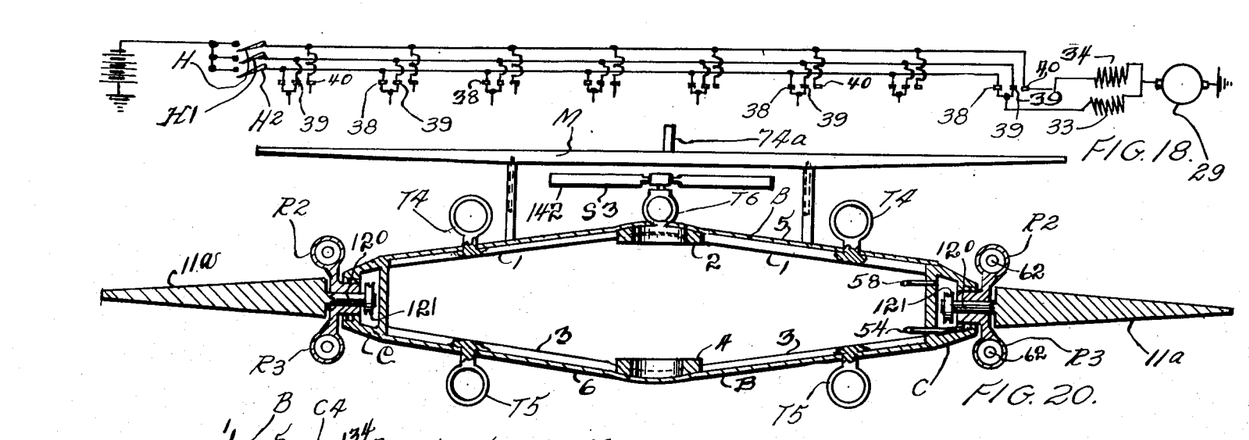
Figure 18 is a diagrammatic sketch showing the control circuit for the electric motors 29—30 of the adjusting means of which there is one for each pair of airfoil blades, this means being illustrated as a detail in Figures 8, 9, 11. This control circuit illustrates the circuit as applied to the sets of contacts 38, 39, 40 of each adjusting means associated with the pairs of airfoil blades 11 of the upper mounting ring E, and as controlled as main circuits by the contacts 41, 42, 43 and the brush means 47 in contact therewith. It should be noted here that there is a similar circuit in association with the contacts 44, 45, 46, of the lower mounting ring F and the brush contact means 48 in association therewith. Since this second circuit is similar to that as illustrated in Fig. 18, this second circuit is not otherwise illustrated than by reference to Figure 18 as identical.
Figure 20 is a transverse substantially vertical cross sectional view on lines 20—20 of Figures 19, 25.
Figures 21, 22:
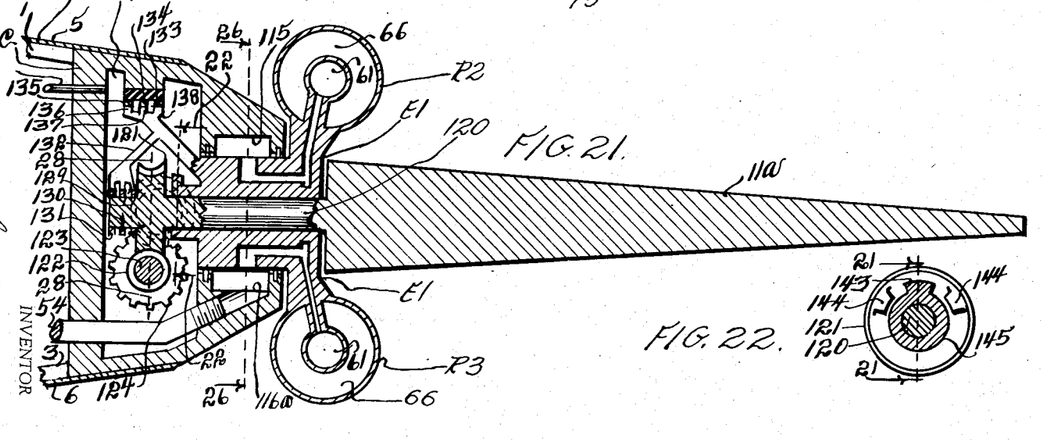
Fig. 21 is enlarged somewhat more than three times and shows only the section at one side through supporting means for one airfoil blade and one such blade, such support means being similar for each blade, except that supply pipes need not be included for each blade means and there are only four of the devices R and four R1.
Fig. 22 is detail section on line 22—22, Fig. 21.

Each turbine power unit T, T1, T2, is substantially as shown in Figure 17, and of any type which may be desired. Turbine units T (two) and T2 (one), three in all are operable not only as power propulsion for translational flight as jet units, but they also are stabilizing unit drive means, when such stabilization is required. Stabilizing rotors S, S1, S2, are mounted on the turbine units T, T2, over them vertically and each has a tubular drive shaft mounted to rotate on a vertical axis and capable of driving the rotor hub and its blades. Tubular drive shaft 76 and the hub 77 are rotatable by large spur gear 78 and spur gear 79 by shaft 80 having interposed the disconnectable clutching means 81, and shaft 80 is driven by bevel gears 82 and thereby by turbine shaft 83. Hub 77 has rotor airfoil blades 84 oscillably mounted in it and each blade 84 is by its crank arm 85 and a connecting link 86 connected with arms 87 on the upper end of a control piston 88, and the latter is reciprocable vertically in the cylinder 89 fixed on the upper side of hub 77, so that when control piston 88 moves up or down it oscillates the blades simultaneously and uniformly in the same change of incidence through connecting links 86 and crank arms 85, so that all blades of a stabilizing rotor S, or S1, or S2 (that is of one such unit) are as a consolidated unit made to have the same change of blade incidence to cause uniformly greater lift effect or lesser lift effect by the stabilizing unit as a unit. Each cylinder 89 of the rotors is connected by the bore of the tubular drive shaft 76 and the associated conduit 90 with an associated pressure fluid conduit 91, the latter a common supply conduit, and the individual conduit 90 has interposed a valve means 92 which has valve 93 movable one way to release pressure from cylinder 89 to release conduit 94 and movable the other way to close the release conduit and to permit communication of the individual conduit 90 with the pressure fluid conduit 91. Each valve 93 is movable by a spring 95 to move it to the release position and is movable by an armature 96 and solenoid 97 to close the release and open the pressure fluid conduit 91 to the independent conduit 90. Each solenoid, three, one for each stabilizing rotor unit, is connectable with a current source 98 by its contact 99 and an associated contact 100 of three of such last named contacts on a control stick 101, the latter being movable into lateral contact positions or rear contact position by manual hand control or by any automatic gyroscopic or other control means (not shown) but such as are available for control or stabilizing of aircraft. Normally each stabilizing rotor has its blades so stationed, as to incidence, that the stabilizing rotor unit does not exert any lift effect but is in a neutral condition, and when stabilizing is needed its common angles of incidence (common to all blades) may be given increased angle for upward lift so that an upward lift is created by that particular stabilizing rotor unit, S, or S1, or S2, as the case may be. In use of the aircraft, as a fixed wing aircraft, the stabilizing rotors may be disconnected from the turbine power units by the clutching means 81, that is all three clutches 81 may be disconnected.

Each turbine power unit T, T1 and T2 has connection by means of conduits 102, each having hand valves 103 for closing of the conduits, with the conduit 54 delivering into the annular space C2, so that air under pressure from the air discharge from the air compressor of the turbine unit may be delivered through conduit 54 or any such conduits, to the annular space C2, and thus by way of conduits 55 or 56, to the rocket combustion chamber 61 of each ram-jet-rocket unit R and R1. The conduits 54a (Figure 4) are similarly in connection with the conduits 102 to provide for passage of air under pressure, from the turbine power units, as controlled by hand valves 103, to the conduits 55 and 56. There is formed longitudinally of the aircraft along and in the central vertical plane of the ship, a comparatively small, narrow, observation and pilot's cabin 104, and this is connected at front and rear ends by brackets 105 with outer ring 68 to aid in securing the latter in its relative location. This cabin 104 and brackets 105 may be omitted, and any other type of pilot's cabin formed in the structure B, as may be found convenient. It will be seen in Figure 15, that there is a space 106 under the forward and rear portions of the members 104 and 105 so that these members do not interfere with rotation of the airfoil blades 11 and the ram-jet-rockets R. There is also a somewhat similar observation and pilot's cabin 107 formed longitudinally of the structure B protruding slightly below that structure and this has at forward and rear end brackets 108 similar to brackets 105 which are fixed to the outer ring 68 to aid in securing the latter in its relative location. The members 104 and 107 are each relatively narrow in width laterally of the aircraft and do not interfere to any substantial degree with the relative form of the disk-like structure B as is shown in Figures 15 and 16. The space 109 over the forward and rearward extensions of the members 107 and 108 permit free rotation of the blades 12 and the ram-jet-rockets R1 of the lower annular mounting ring F.

The members 107 and 108 and the nacelles of the turbine power units T1 by their bottoms form a triangular means by which the aircraft as a whole may be supported on the ground in take-off and landing. Any other type of landing means or gear such as wheels or pontoons commonly employed may be used for support of the aircraft on the ground or water for takeoff and landing. Each ram-jet-rocket device R and R1 has a spark plug or other ignition means 110 which may be supplied with ignition current by a fourth contact brush 111, 112, respectively carried by the mounting rings E and F, respectively. Any other type of ignition current supplying means may be used instead such as any commonly used ignition current supply means carried with each mounting ring E or F in rotation, such means being not shown, however. Entrance or exit doors for the cabin or load carrying space D in structure B may be formed in any manner as entrance and exit means are formed in fuselages or aircraft structures, and such means may be located in the upper wall 5 or lower wall 6 of structure B in any manner.

In the use of my aircraft device the space D within the framework of the structure B will be used in any manner to carry the load, with any compartmentation or devices as may be necessary. Assuming reservoir G to be supplied with fuel such as propane, liquified petroleum gas or gasoline or other fuel and the means G to be capable of delivering this fuel as a gaseous or carburetted air fuel to the supply pipes, those for the ram-jet-rocket devices R and R1, and also that each turbine T, T1, and T2, has its proper fuel supply and a control for such fuel supply, the pilot of the aircraft in preparation for take-off, starts each turbine T, T1, T2 in operation so that the power shaft is rotated under power, the pilot sees to it that, for quick take-off without take-off run of any considerable length, or none, the clutching devices 81 are all engaged for turbines T, T1, T2, and that current is supplied to the electrical devices, he may initiate rotation of the mounting rings E and F with their airfoil blades, in opposite directions by opening hand valves 103 to supply air under pressure from the compressors of the turbine units T, T1, T2 (or T, T1, only), as desired, to the rocket combustion chambers of each ram-jet-rocket R and R1, and also may permit fuel gas to flow to these devices by opening hand-valves V, and gas and air will enter each combustion chamber 61 of devices R and R1 and will combust therein and discharge rearwardly of the device R or R1. This air and fuel flow should be large enough in volume to provide a starting impulse for the rotary wing means by this means as a rocket jet means for each mounting ring E and F. Since these rocket devices and ram-jet means are directed in opposite directions, four on each mounting ring, these rings E and F will rotate in opposite directions, and gain speed. As speed is increased additional fuel gas may be caused to flow whereby speed will still further increase the air entering the ram-jet mouths from atmosphere directly and combusting with the additional fuel. Having gained speed airfoil blades 11 and 12 may be caused to assume the angles of incidence (in opposite directions) as shown Figure 14, and as they rotate in opposite directions with mounting rings E and F, the upper blades 11 will cause downward flow of air and the downward flow of air through spaces X between the wing rotors will be again contacted by the lower airfoil blades 12 and these will again cause upward lift by their aerodynamic action on the air. When blades 11 and 12 are in the tilted positions of incidence such as in Figure 14, spaces between the tilted blades are open so that air can flow from atmosphere above the aircraft to atmosphere below the aircraft, as moved by blades 11 and 12, and cause upward lift on the aircraft in the manner of rotary wing blades, and somewhat in the manner as blades of a turbine air compressor cause movement of air.

When sufficient fuel gas is supplied the upward lift produced will cause upward climb of the aircraft, and the pilot must then either himself or by any automatic pilot means provided, cause the control stick 101 to be moved as necessary to cause the contacts 99 to be contacted as necessary to cause any stabilizing rotor S, S1, S2, as necessary, to provide upward lift at any particular point of the triangle provided by the three stabilizing rotors S, S1, S2, and when any such contact is made current will flow to the solenoid 99 associated and this will cause fluid under pressure to flow to the bore in the hub 77 associated whereby the associated piston 88 will be caused to rise and by cranks 85 increase the angles of incidence of all the blades of that particular stabilizing rotor S, S1, S2, so that stabilizing impulse is then provided as necessary.

To procure the change of the blades 11 and 12 of the wing rotors of rings E and F, the pilot closes hand switch H to cause electric current to flow to motors 29—30 of adjusting devices by way of ring contact 41, a brush contact, and then to contacts 40 to cause the motor armatures to rotate in the proper direction to cause flow of liquid into the ends of the associated cylinders of all adjusting means of both rings E and F, and liquid will flow to cause the pistons to move the cranks 15 and to give the proper incidence to the blades 11 and 12. Flow is simultaneous in adjusting cylinders 22 of both upper mounting ring E and lower mounting ring F, so that they act in unison and are controlled in unison. The movement of the pistons in the direction to give the proper incidence is limited by the cylinder construction so the piston is stopped and also this movement is limited and controlled by the contacts 38, 49, 40, each adjusting means being itself similarly but independently controlled; the main control being a common control.

When the aircraft has attained a sufficient height, in travel, the pilot may then, if he desires, cause the aircraft to be converted to the condition for high speed translational flight, and to effect this conversion, he will give to the turbine power units T, T1, T2 such power output as necessary to provide high propulsion ability as jet propulsion means. He will also lessen the flow of fuel gas to devices R and R1, and will open the hand switch H, first closed, then close hand switch H1 to provide current for the reverse direction of rotation of all adjusting motors of devices of both rotors, and then these adjusting motors 29—30 will rotate the pump gears of each unit in the opposite direction to that when angles of incidence for rotor sustentation was provided, and the pistons 21 of the adjusting means will move a distance controlled by the contacts 39 to cause all blades 11 and 12 to move to the positions such that they are substantially flat in the plane of rotation of the blades, that is so that there is no angle of incidence any way, and all gaps between blades 11 are closed and all gaps between blades 12 are closed and the blades 11 and 12 provide no sustentation effect by rotation with their mounting rings. The fuel-gas flow to devices R and R1 may then be caused to cease entirely and air valves 103 may be closed, when the rings E and F have taken that position when devices R and R1 are in the positions which give least obstruction to travel, as in Figure 1. He may now increase fuel flow to turbine units T, T1, T2 to provide the travel speed desired, and clutches 81 of stabilizing rotors S, S1, S2 may be disconnected. At any time he may use the ordinary stabilizing and directional control devices provided, 72, 73 and 74—75. In high speed translational flight the rear control surfaces 72, 73 and M provide travel of the aircraft, in substantially the angle of incidence to the direction of travel as in Figure 15, so that the disk like structure B in connection with the flatly located blades 11 and 12, provide sustentation in flight as a fixed wing, the upper and lower walls of structure B and the flat blades 11 and 12 providing a wing surface such that upward lift is provided as is usual in fixed wing flight. The thrust of turbine power units T, T1, T2, as jet propulsion units is horizontally along the line Z—Z1, Fig. 15, or parallel to that line, so that they aid in giving the correct angle of incidence, in conjunction with the empennage control surfaces.

If at any time, the pilot desires to cause the wing rotor means to resume operation for slow flight or hovering or landing, he may again cause the mounting rings to be rotated in opposite directions, as before, by initiating power output in the rocket combustion chambers 61 and then ram-jet power output, by the ram-jet air flow and fuel combusted therewith, and by adjusting means, as indicated above, he may again cause the blades 11 and 12 to assume the angles for sustentation effect in rotation, and he may again resume stabilizing control by means of the control stick 101 and the stabilizing rotors S, S1, S2. The power output of the turbine units may be diminished as necessary, the ram-jet-rocket devices R and R1 may be caused to operate either as complete or sole ram-jet combustion power units or as ram-jet plus rocket propulsion of the mounting rings E and F. By manoeuvering as indicated, he may cause hovering or slow flight, or landing.

In any construction, the transverse sectional configuration of the aircraft will be such as will for the particular size of the construction, and its calculated speed of flight, as fixed wing, provide the most efficient sustentation effect with least power output and fuel cost.

Referring now to the form of my device which is illustrated in the Figures 19, 20, 21, 22, 24, 25, 26, 27, 28, 29, this form is in its general plan and in the general functioning of the rotary wing structure and central structure B, similar to the first form described, but this modified form illustrates the use of my device without two rotor wing mountings but with only one mounting ring for blades, that mounting ring mounting blades rotating only in one direction, there being a reaction between the blades and the ram-jet-rocket propulsion means, such that there is little torque upon the central structure B, to rotate the latter, this torque to the extent that it exists being counteracted in part by the control surfaces and in the major degree by the turbine power units which may be controlled to produce rearward jet propulsion effect and reaction which will prevent rotation of the central structure B, as such.

The structure B is similar in this form, with the exception that the annular wall C has a somewhat different construction in respect to its internal spaces and the particular manner in which the mounting ring E1 is supported and by which rotation is provided, and further in that mounting for only one mounting ring E1, is provided.

The mounting ring E1 in this form has one set of wheels, all denoted 113, rotatably mounted on axles 114 fixed in the mounting ring E1 to rotate in wells in the ring, vertically formed, the upper section of each wheel 113 protruding slightly above the upper edge of the mounting ring E1 so that the wheels 113 rotate on or against a downwardly faced surface 115 in the annular wall C. Another set of wheels 116 are rotatable on axles 117 fixed in ring E1, rotating in wells formed in the ring E1, the lower section of the wheels protruding slightly below the lower surface of the mounting ring E1, so that this set of wheels will rotate on or against a surface, annular, formed in annular wall C. All wheels 113, 116 may have pneumatic rubber tires 118, 119, thereon, on the rims, so that the rotation of the mounting ring E1 may have slight cushioning in rotation and may also rotate relatively quietly. All axles 114 and 117 are horizontal or inclined slightly to the horizontal as may be necessary for most efficient rotation and support of the central structure on the mounting ring E1 in rotation of the latter. Wheels 116 rotate on surfaces 116a.

The mounting ring E1 carries the airfoil blades 11a mounted on adjusting axles or pivoting members 120, oscillably mounted in mounting ring E1, to oscillate on relatively horizontal axes, that is axes in the plane of rotation of mounting ring E1, and these pivoting members 120 have fixed on their inner ends internally of space C4 in annular wall C, worm wheels 121, each pivoting member having one worm wheel 121. Each of the latter has in engagement with it a worm pinion 122 on its bearing shaft 123, and the latter is rotatable through its spur gear 124, and small spur gear 125, by armature shaft 126, which rotates within a field having coils 127 and 128 for operation of the armature in either direction, this opposite rotation providing for the adjustment movement either way in oscillation of the associated blade. Each blade has this adjusting means. Each pivoting member 120 has fixed on its radially inward end, a set of contacts 129, 130, 131, mounted with any insulation on the pivoting member 120, to rotate or oscillate with it, and these contacts are contacted by three contact brushes all denoted 132 carried on ring E1 and these contacts are of a limiting length such that there may be rotation by the associated motor only as long as the contact exists through the particular contact. These latter contacts are for further designation, designated 129, 130, 131, in Figure 29. Passage of current through any one of these contacts is determined by the ring contacts 133, 134, 135 fixed on the internal wall surface of annular wall C, so that brushes 136, 137, 138, may contact them, each brush contacting one contact in the entire rotation of mounting ring E1.

This form of my device has another type of stabilizing rotor means. It should be noted here that any type of stabilizing means may be used with my device and with either form of it. In this form there is shown, a single stabilizing rotor which is a cyclic pitch change rotor such as is used in helicopters employing cyclic pitch change rotors. This stabilizing rotor designated S3 in this form, is shown in enough detail to show its cyclic pitch change means, in Figure 24, it being contemplated, however, that the pitch change means and its control may be of any type which is commonly used and known as any form of cyclic pitch change means will provide the necessary stabilizing effect of the stabilizing rotor S3. In Figure 24, the control stick 139 is mounted at its upper end by a universal joint 139 so it may swing in any direction on that joint, and it bears fixed on it swash plate 140 by which the crank arms 141 of the airfoil blades 142 are contacted, to change their pitch cyclically according to control imposed by control stick 139, and thus blades 142 may change in pitch in each rotation, cyclically and as controlled by control stick 139 to effect stabilization according to the need. Manual or automatic direction of control stick 139 may be used as automatic control means for such pitch change means are known. Stabilizing rotor S3 and turbine T6 are shown front elevation in Fig. 20.

The mounting ring E1 has ram-jet-rocket devices R2 fixed on it above it and ram-jet rocket devices R3 fixed on it below it, all of these, above and below, providing rotational thrust in the same direction of rotation and all being capable of action simultaneously as a unit, there being four shown in all. They are all fed with air under pressure and fuel-gas to the rocket combustion chambers as in the first form and particularly as shown in Figure 10, and conduits deliver air under pressure and fuel gas under pressure, as in the first form.

Turbine power units T4 are mounted on structure B above it and turbine power units T5 are mounted on structure B below it all providing jet propulsion in the same direction for translational flight. All or some may provide for the air under pressure delivery to the ram-jet-rocket devices R2 and R3, as in the first form. Only the turbine power unit T6 has driving connection with stabilizing rotor S3 and this has the disconnectable clutching means 81 as in Figure 17. Only one rudder 74a is shown in this form.

The airfoil blades 11a in this form may be given the angle of incidence by closing of switch H (Figure 29), to provide the limited turning of all blades to the correct angle of incidence for upward lift most efficiently. All blades may be caused to assume the flat positions without angles of incidence for lift effect, by opening switch H and closing switch H1. When flat all blades 11a are aligned in the same plane so there is no lift incidence and they have the best positions for flight of the aircraft as a fixed wing structure. No outer ring such as 68 is included in this form as there is only one set of blades 11a, and each of these blades will have that form best suited for aerodynamic sustentation of the structure B and the blades 11a, as a unit. The entire assemblage of structure B and blades 11a will in flight as fixed wing aircraft for translational flight, have that angle of incidence in the direction of flight, as will be controlled by the stabilizing surfaces of means 72, 73 and M, and the general inclination will be that as given to the first form and as illustrated in Figure 15. A small pilot's cabin 143 on the structure B may be provided or any form of such cabin may be provided. The initiation of rotation of mounting ring E1 of this form is as in the case of the first form and continuous rotation may be by pure ram-jet action or thrust or ram-jet and rocket thrust and this may be controlled as in the first form.

Figures 25, 26, 27, 28, 29:
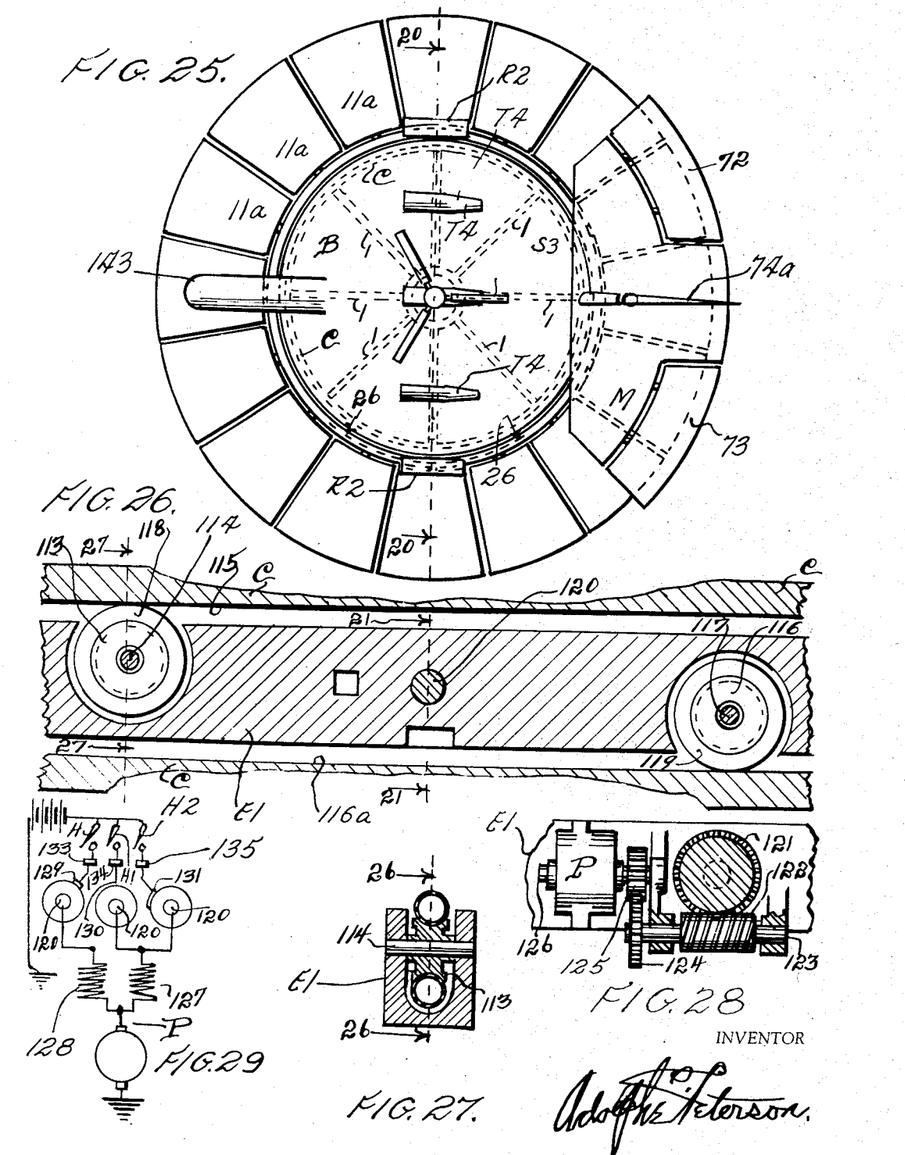
Fig. 25 is full plan view of this form, reduced scale, one-half.
Figure 26 is a section on line 26—26 of Fig. 25.
Fig. 27 is a section line 27—27 of Fig. 26.
Fig. 28 is a section on line 28—28 of Fig. 21.
Fig. 29 shows a circuit associated with one adjusting means.

In Figure 29 illustrating the circuit of this modified form, there is shown only the circuit from the ring contacts 133, 134, 135, through the limiting contacts of one motor P which adjusts one pivoting member 120 of one airfoil 11a, but it should be understood that in this form as in the first form described, the ring contacts supply current simultaneously through the special limiting contacts 129, 130, 131, of each of the motors P of the airfoil members 11a, each thereof having one such adjusting means with its limiting contacts 129, 130, 131. The circuit shown in Figure 18, relating to the first form, likewise shows only the connection with limiting contacts of one mounting ring E, but it should be understood that the hand switches H and H1 through their main lines delivering current, also control the circuits through the motors of the mounting ring F, in the same manner and simultaneously, although the associated motors procure an opposite angle of incidence in the rotating wing condition.

In either form switch H2 and the limiting contacts provide for another condition of operation, but this other condition is not intended to be a condition to be effected at any time in ordinary use of the device, but is only to be used as an emergency feature, when there is a failure of the power propulsion means from any cause. In such emergency use, which is not contemplated to be an ordinary use or even a necessary feature of the device, a third limiting contact 38, an element of each adjusting means, provides for some further movement of the airfoil members 11 and 12 in adjustment, to positions of incidence such that each air foil member 11 and 12 will have that incidence which will permit continued rotation of the air foil members and their mounting rings, as freely rotating but not power propulsioned means, that is will permit rotation in the nature of auto-rotation for a descent of the aircraft, in the manner of auto-rotating auto-gyro rotors. In the modified form, the third contact 131, Fig. 29, provides for this same change of incidence such that the auto-gyro rotation may be permitted. This method of use, however, is a use, which is not to be ever adopted, except in the event of emergency, as the preferable use is always under the propulsive effect of either the forward translational propulsion motors, turbines T, T1, T2, or the ram-jet rocket devices R, R1, or R2. In fixed wing flight, airfoil members 11, 12 of the one form and 11a of the other always are inclined as nearly in the plane of the disk formed by them as may be effected. In the opposite or rotating wing condition they are all in the angles of incidence which is most suitable for power propulsioned rotating use. In the first form the pistons 21 in their cylinders provide a limitation of movement. In the second form, there is a limiting stop 143, Fig. 22, which is fixed on the sleeve or bearing 145 which is a part of the mounting ring E1 and this limits the movement of the worm wheel 121 which has stops 144 formed on it on opposite sides—circumferentially—of limiting stop 143. This limits turning movement of the pivoting member 120 and thus that of the air-foil member, to the two extremes of movement to effect change of incidence. It should be noted here that I do not show other limiting means, but that in some constructions, there may be used any other types of limiting means which would aid in the control of the incidence change adjustments. Such means is not specifically shown since it would add to the complication of the drawings.

The means for supply of fuel as illustrated, is contemplated to be only one form of such supply, and that any other method of supply of fuel may be used. In the event that there is supplied a mixture of air and fuel which may be somewhat combustible, any device such as is commonly used, such as screens, commonly known for such use, may be used to prevent backfiring from the combustion chambers 61, but if a gaseous fuel such as has no air admixture or oxygen admixture is used, there is no combustible mixture, until the air and fuel are introduced to the combustion chambers 61.

The external contour of the upper and lower walls 5 and 6 may be modified in any extent as to its shape which will contribute to the aerodynamic efficiency of the entire disk-structure, for sustentation of the aircraft in fixed wing flight, and likewise the airfoil members 11 and 12, and 11a may be formed in the particular shape which is found most suitable for efficiency in each of the conditions of use, as a fixed wing means in cooperation with the structure B, or as a rotating wing means. All of the turbine power devices and likewise the ram-jet-rocket devices may be so streamlined and faired into their mounting structures, that the utmost efficiency in use is procured. It may be noted in this respect, that it is the contemplation of the invention, that in view of the dual nature of use of the device, where much of the exposed surface is utilized as rotary wing means, in that condition, there may be relatively high speed in the fixed wing condition, and that therefore, the relative size in proportion to weight and sustentation efficiency in proportion to size will be improved and this result contributes to the over-all efficiency in use.

By the designation of space interiorly of the fixed airfoil structure as space for a load, and by designation of the main or fixed circular airfoil structure as a load carrying structure, in the claims, I do not intend thereby to in any way restrict the application of the claims to only an aircraft carrying the load within the said main or fixed airfoil structure, but contemplate that the load may be carried in any manner as loads are commonly carried by aircraft, as by fuselage structure formed with or interconnected with the airfoil structure, the designation of "load carrying structure" being intended to comprehend an airfoil structure capable of carrying a load. The designation of upper and lower wall structure is contemplated to mean that structure including the wall surface and its support means, and the designation of "annular wall structure" is contemplated to comprehend any annular framing structure capable of forming bearing support for the mounting rings and their airfoil members, in rotation upon it.

While I have shown particular devices and combinations of devices in the description and illustration of my invention, I contemplate that other detailed devices and combinations of devices, may be used in the realization of my invention, without departing from the principles thereof and my contemplated claim of invention. Particularly in any construction, stabilizing rotors such as S, S1, S2, S3, may be omitted and the device used with the means M, 72, 73, 74, 74a, or any other stabilizing means, and then especially, there being some horizontal travel maintained in flight.

What I claim is:

1. In an air-craft, an airfoil structure circular in periphery, the said airfoil structure having around its periphery an annular wall structure and having an upper wall structure and a lower wall structure each extending between sides of the annular wall structure periphery, said airfoil structure by the conformation of the upper and lower wall structures and the thin depth in proportion to diameter forming a non-rotating airfoil for sustentation of the aircraft in translational flight; an annular mounting ring having bearing mounting in the annular wall structure to rotate about the annular wall structure as a support therefor in rotation; a plural number of airfoil members equi-distantly spaced about the mounting ring and each supported in the mounting ring by an associated pivotable member to be oscillative on an axis in the plane of the mounting ring, each of the said plural number of airfoil members having a shape such that in aligned positions at zero angle of incidence the said airfoil members form a substantially continuous circumferential airfoil surface about the mounting ring and in the plane of said mounting ring; and adjusting means carried on the mounting ring and having actuating interconnection with each of the pivotable members by which airfoil members may be moved into positions of incidence to provide sustentation of the air-craft in rotation of the annular mounting ring and the airfoil members about the annular wall structure, and may be moved alternatively in unison to positions aligned with each other in the plane of the mounting ring and without angles of incidence to that plane to provide in that aligned position fixed airfoil surface circumferentially around the said airfoil structure and complementary to the airfoil surfaces of the said airfoil structure as sustentation fixed airfoil means in translational flight.

2. All the means described and claimed in claim 1, the said adjusting means including cylinder means carried on the mounting ring, piston means operable in the cylinder means and having interconnection with the said pivotable members to turn the pivotable members and their associated airfoil members in their bearings in the mounting ring to positions of incidence for sustentation of the aircraft in rotation of the mounting ring and the airfoil members about the annular wall structure.

3. All the means as described and claimed in claim 1 and in combination therewith, a stabilizing means carried on the airfoil structure to effect stabilizing force and maintain equilibrium in air-borne flight.

4. All the means described and claimed in claim 1 and in combination, stabilizing means including three stabilizing rotor airfoil means mounted on the airfoil structure at three spaced locations circumferentially of the axis of the annular wall structure and power torque developing means for each stabilizing rotor air-foil means and interactuably associated therewith to effect rotation of the stabilizing rotor air-foil means, and a control means for the said stabilizing rotor airfoil means to effect incidence change of the airfoil means of either of the stabilizing rotor airfoil means as may be necessary for stabilization of the aircraft in air-borne flight.

5. All of the means described and claimed in claim 1 and in combination, stabilizing means including a stabilizing rotor airfoil means mounted on and to rotate on an axis substantially axially of the airfoil structure and power torque developing means for the stabilizing rotor airfoil means and interactuably connected therewith to effect rotation of the stabilizing rotor airfoil means, and a control means for the stabilizing rotor airfoil means to effect change of relative cyclic incidence of airfoil blades of the stabilizing rotor airfoil means in rotation for stabilizing thrust upon the airfoil structure in air-borne flight.

6. All of the means described and claimed in claim 1, and in combination; a propulsion means mounted on the airfoil structure to effect propulsion for translational travel, and propulsion means mounted on the annular mounting ring to effect propulsion of the annular mounting ring and its supported airfoil members in rotation about the annular wall structure.

7. All of the means as described and as claimed in claim 1 and in combination, an empennage structure fixed on and mounted over the rear section of the airfoil structure and including horizontal travel directional means and including vertical travel directional means for guidance of the aircraft in translational flight, and a stabilizing means carried on the load carrying structure, the last named stabilizing means including means to effect stabilizing force on the aircraft to maintain the aircraft in equilibrium in sustentation thereof by the rotation of the mounting ring and its airfoil members when in their condition with angles of incidence to the plane of rotation.

8. All of the means as described and as claimed in claim 1 and the adjusting means for the pivotable airfoil members comprising in combination, mounting bearings for the pivotable airfoil members the latter having each a pivoting member pivotable in the mounting bearing; a cylinder means carried on the mounting ring and having piston means operable in the cylinder means, the piston means having interconnection with the pivotable members to turn the pivotable members and the associated airfoil members, a pump means having conduit connection with the cylinder means, one side of the pump connecting with one side of the piston and the other side of the pump connecting with the other side of the piston and an electric motor means to rotate the pump in either direction to pump fluid from one side of the piston to the other and vice versa.

9. In an aircraft; a main circular airfoil having around its periphery an annular wall structure and having upper and lower walls extending interiorly of the annular wall structure, said main circular airfoil by the conformation of the upper and lower walls and the thin depth in proportion to diameter forming a non-rotating fixed airfoil for sustentation in translational flight; an annular mounting ring having bearing mounting on the annular wall structure to rotate about the annular wall structure as a support therefor in rotation; a plural number of airfoil members spaced about the mounting ring and each having a pivotable mounting by which it is supported in an airfoil bearing formed in the annular mounting ring and by which it is oscillative in said airfoil bearing to an angle of incidence for sustentation in rotation with the annular mounting ring and by which it may be oscillative to a position at zero angle of incidence for sustentation as fixed airfoil surface complementary to and annularly of the exterior surfaces of the said main circular airfoil, the said last named plural number of airfoil members having each a length arcuately of the mounting ring throughout its length radially of the structure and having each a shape such that the plural number of airfoil members in the aggregate when in aligned positions each at zero angle of incidence to the plane of rotation form a substantially continuous circumferential airfoil surface about the mounting ring and in the plane of the periphery of the main circular airfoil; propulsion means to provide a rotational movement of the annular mounting ring and its airfoil members about the main circular airfoil and to propel the aircraft in translational flight.

10. All the means as described and as claimed in claim 9, and in combination; adjusting means having actuating interconnection with each of the pivotable airfoil members and by which the pivotable airfoil members may be moved into positions of incidence to provide sustentation of the aircraft in rotation of the annular mounting ring and its airfoil members about the annular wall structure.

11. All the means as described and as claimed in claim 9, and in combination; stabilizing means including three stabilizing rotor airfoil means mounted on the aircraft at three spaced locations and power driving means for each stabilizing airfoil rotor and interactuably connected therewith to effect rotation of the stabilizing rotor airfoil means, and a control means for the said stabilizing rotor airfoil means to effect incidence change of the airfoil means of either of the stabilizing rotor airfoil means as may be necessary for stabilizing of the aircraft when air-borne and directional airfoil means mounted on the aircraft for directional change of the aircraft in air-borne translational flight.

12. In an aircraft, a main circular airfoil structure having around its periphery an annular wall structure and having an upper wall structure and a lower wall structure each extending between sides of the annular wall structure periphery, said main circular airfoil structure by the conformation of the upper and lower wall structures and the thin depth in proportion to diameter forming a non-rotating airfoil for sustentation of the aircraft in translational flight: a pair of rotatable airfoil units super-imposed one over the other and each of which rotatable airfoil units is comprised of an annular mounting ring having bearing mounting in the annular wall structure of the said main circular airfoil structure for rotation about the annular wall structure as a support therefor in rotation, a plural number of airfoil members equi-distantly spaced about the mounting ring and each supported in the mounting ring by an associated pivotable member to be oscillative on an axis substantially in the plane of the mounting ring, each of the said plural number of airfoil members having a shape such that in aligned positions at zero angle of incidence the said airfoil members form a substantially continuous circumferential airfoil surface about the mounting ring and in the plane of said mounting ring: each of the said rotatable airfoil units having an adjusting means carried on its said mounting ring and having actuation interconnection with each of the pivotable members of the unit and by which the airfoil members may be moved into positions of incidence to provide sustentation of the aircraft in rotation of the annular mounting ring and its airfoil members about the annular wall structure, and by which the airfoil members may be moved alternatively in unison to positions aligned with each other in the plane of the mounting ring and each at zero angle of incidence to that plane to provide in the aligned positions fixed airfoil surface circumferentially around the main circular airfoil structure and complementary to the airfoil surface of the main circular airfoil structure as sustentation fixed airfoil means in translational flight.

13. The means as specified and as claimed in claim 12, and in combination; propulsion means carried on the aircraft to provide rotational movement of the said rotatable airfoil units in opposite directions of rotation about the annular wall structure.

14. The means as specified in claim 12, and in combination; a propulsion means mounted on the said main circular airfoil structure to effect propulsion of the aircraft for translational travel, and propulsion means mounted on each of the said rotatable airfoil units to effect propulsion of the said rotatable airfoil units, in opposite directions, about the said annular wall structure.

References Cited in the file of this patent

UNITED STATES PATENTS

| | | |
|---|---|---|
| 2,262,613 | Larsen | Nov. 11, 1941 |
| 2,317,340 | Bennett | Apr. 27, 1943 |
| 2,377,835 | Weygers | June 5, 1945 |
| 2,521,684 | Bates | Sept. 12, 1950 |
| 2,604,951 | Benedek | July 29, 1952 |
| 2,605,608 | Barclay | Aug. 5, 1952 |

FOREIGN PATENTS

| | | |
|---|---|---|
| 321,642 | Italy | Oct. 11, 1934 |
| 405,295 | Italy | Oct. 3, 1943 |
| 409,193 | France | Feb. 12, 1910 |
| 931,296 | France | Oct. 6, 1947 |